(12) United States Patent
Montgomery

(10) Patent No.: US 7,207,289 B2
(45) Date of Patent: Apr. 24, 2007

(54) METHOD OF FEEDING THE CATTLE WITH FEED ADDITIVES THAT INCREASES BEEF PRODUCTION AND REDUCES LIVER ABSCESS

(75) Inventor: Jayden Lloyd Montgomery, Magnolia, DE (US)

(73) Assignee: Intervet International B.V., AN Boxmeer (NL)

( * ) Notice: Subject to any disclaimer, the term of this patent is extended or adjusted under 35 U.S.C. 154(b) by 0 days.

(21) Appl. No.: 11/133,959

(22) Filed: May 20, 2005

(65) Prior Publication Data

US 2005/0284380 A1    Dec. 29, 2005

Related U.S. Application Data

(60) Provisional application No. 60/573,244, filed on May 20, 2004.

(51) Int. Cl.
*A01K 5/00* (2006.01)
*A01K 39/00* (2006.01)

(52) U.S. Cl. .................................. 119/51.01; 426/635

(58) Field of Classification Search ............. 119/51.01, 119/72; 426/625, 807
See application file for complete search history.

(56) References Cited

U.S. PATENT DOCUMENTS

| | | | |
|---|---|---|---|
| 4,585,770 | A | 4/1986 | Frechet et al. |
| 5,731,028 | A | 3/1998 | Chevremont et al. |
| 5,847,124 | A | 12/1998 | Chevremont et al. |

OTHER PUBLICATIONS

P.E. Strydom, "The Effect a Beta-Agonist (Zilpaterol) on Meat Colour Shelf Life", Proc. of 46th ICoMST, Buenos Aires, Argentina (2000) p. 148-149.

Tech Report "Tylan Efficacy: A 40-Trial Summary" Beef 1994, Laudert and Vogel, Lilly Research Laboratories.

E.L. Potter, et al. "Effect of Monensin and Tylosin on Average Daily Gain, Feed Efficiency and Liver Abscess Incidence in Feedlot . . . " J of Anim. Sci. V61, N5 1985, p. 1058-1065.

K.F. Lechtenberg, et al. "Hepatic ultrasonography and blood changes in cattle with experimentally induced hepatic abscesses" Am J. Vet. Res. (Jun. 1991) V52, N6, p. 803-809.

S.J. Bartie et al. "Effects of Liver Abscesses on Steer Performance and Carcass Characteristics" Texas Tech Univ. Agric. Sci. Tech. Rep. No. T-5-297, p. 57-58.

D.R. Brink, et al. "Steer performance and factors which affect severity of liver abscesses" Journal of Animal Science, V61, Supp 11, p. 496-497.

S.D. Farlin "The costs of liver abscesses feedlot cattle may be suffering more than you know" (Aug.-Sep. 1980) Animal Nutrition & Health p. 6-7.

D.R. Brink, et al. "Severity of liver abscesses and efficiency of feed utilization of feedlot cattle" (1990) Journal Animal Science, p. 1201-1207.

S.D. Farlin "Liver abscesses: How much do they cost the cattle feeder?" (Aug. 1980) Beef, p. 44-45.

*Primary Examiner*—T. Nguyen
(74) *Attorney, Agent, or Firm*—William M. Blackstone; David M. Gryte; Mark W. Milstead

(57) ABSTRACT

The present inventions relates to a method of increasing beef production in cattle with feed additives, comprising feeding cattle with feed, comprising an effective amount of an ionophore in combination with a macrolide antibiotic, and thereafter feeding cattle with feed, comprising zilpaterol and essentially no ionophore or macrolide antibiotic for the succeeding about 20 to 40 days.

6 Claims, No Drawings

METHOD OF FEEDING THE CATTLE WITH FEED ADDITIVES THAT INCREASES BEEF PRODUCTION AND REDUCES LIVER ABSCESS

This patent claims priority to U.S. Provisional Patent Application No. 60/573,244, filed May 20, 2004.

FIELD OF INVENTION

The present inventions relates to a method of feeding cattle with feed additives to increase beef production and decrease the incidence of liver abscess.

BACKGROUND OF INVENTION

The United States is the leading beef producer of the world. In 2003, the United States produced over 26 billion pounds of beef and the United States per capita consumption averaged 64 pounds. Beef averages approximately 31 percent of the total per capita consumption of meat; however, beef's share of consumer retail spending was 40.2 percent of the total dollars spent on meat in 2000. Thus, the United States beef industry is a very diverse multi-billion dollar enterprise.

The United States feedlot industry traditionally functions to grow and finish weaned calves (~400–600 pounds) and yearling steers and heifers (550 to 800 pounds) to slaughter weights of approximately 1,100 to 1400 pounds. Because the feedlot industry increases the size and quality of cattle, the industry is constantly driven to increase the rate and efficiency of gain of cattle. The use of growth enhancing agents by the feedlot industry can be easily visualized in that beef (meat) production has risen dramatically over the last several years, while the number of cattle has been in recent decline.

Feedlots are confinement feeding operations where cattle are fed primarily high energy finishing diets prior to harvest. Most feedlot operations feed a relatively high grain diet for 90 to 225 days (depending on starting body weight) resulting in economically efficient weight gains and improved palatability of the retail product. The very nature of a feedlot is to put as much weight on an animal in the least amount of time as possible. This process results in a number of nutritional diseases such as lactic acidosis, feedlot bloat, liver abscesses, polioencephalomalacia, and others. Of these diseases acidosis is the most important and costly nutritional disorder in United States feedlots today.

Lactic Acidosis

Acidosis is caused by a rapid production and absorption of acids, mostly lactic acid, from the rumen when cattle consume too much starch (grain) or sugar in short amount of time. As long as cattle are finished on high energy (grain) diets, lactic acidosis will remain a serious problem in the feedlot industry. Acidosis is not one disorder, rather a continuum of degrees of acidosis. The effects of this continuum of acidosis can be slight, reducing feed intake by ~0.25 lbs/day, or severe enough to result in death. Several acidosis-related problems occur in the feedlot including, sudden death syndrome, polioencephalomalacia, founder, rumenitis, liver abscesses, malabsorption, clorstridial infestations, off-feed, and reduced feed intake.

Typical feedlot acidosis occurs when a large amount of highly fermentable feed (grain) is consumed in a short amount of time resulting in the production of more lactic acid than can be buffered by the rumen. This results in water from the circulatory system being drawn into the rumen, resulting in the rest of the body being dehydrated and pronounced changes in blood pH. Signs can be sub-acute to acute.

Liver abscesses result from a disease complex known as the acidosis-rumenitis-liver abscess complex. *Fusobacterium necrophorum*, a normal inhabitant of the rumen, is the primary causative bacteria. Feeding a high energy grain diet causes ruminal acidosis, as explained above, which attacks the integrity of the rumen wall, permitting opportunistic bacteria such as *Fusobacterium necrophorum* to colonize, enter the bloodstream, and eventually enter and infect the liver. High-concentrate diets also impact the severity and incidence of liver abscesses and acidosis. As the energy levels of the grain rations increase, problems associated with acidosis increase. This cause and effect relationship creates an interesting paradigm, considering the very nature of the feedlot is to put on rapid weight.

DETAILED DESCRIPTION OF THE INVENTION

Ionophores and Monensin

Ionophores are effective in increasing feed efficiency and improving rate of body weight gain principally by altering ruminal fermentation. Monensin is the preferred ionophore.

There are three major fermentation changes associated with feeding ionophores:

Increased production of propionate and decreased production of methane, resulting in increased efficiency of energy metabolism; decreased protein degradation and deamination of amino acids, resulting in the improvement of nitrogen metabolism in the rumen and animal; and decreased lactic acid production in the rumen, leading to a reduction of ruminal disorders.

The most consistent effect ionophores have on altering fermentation is increased molar proportion of propionic acid and a decrease in molar proportions of acetate and butyrate in the volatile fatty acids produced in the rumen. The increase in rumen propionate is accompanied by a reduction from 4 to 31% of the amount of methane produced in the rumen. Additionally, it has been reported that ionophores decrease ruminal ammonia concentrations.

Ionophores provide protection against lactic acidosis by maintaining a favorably higher rumen pH. Ionophores accomplish this by creating an environment that selects for gram-positive bacteria, the major lactic acid-producing bacteria (*Streptococcus bovis* and *Lactobacillius* spp.) are inhibited, but gram-negative lactic acid-fermenting bacteria are unaffected. Maintaining favorable rumen fermentation also impacts the feed intake of cattle by decreasing the variance in daily feed intake, particularly during the period of adaptation to a high concentrate grain diet. The influence on feed intake variability by ionophores should potentially be an additive ruminal benefit.

Liver Abscesses and Tylosin

Dietary stresses such as starting cattle on feed or switching too quickly to high-energy concentrate diets, may spur acute rumenitis. Additionally, the reduced concentration of roughage in the high-energy concentrate diet allows the rumen microflora to produce lactic acid that leads to ulcerative lesions of the rumen mucosa. These rumen lesions allow entry of bacteria into the bloodstream where they are carried to the liver. In the liver the blood is stored and filtered, thus allowing the bacteria to build up. Colonies of bacteria, predominantly *Fusobacterium necrophorum* and

*Actinomyces pyogenes*, grow and produce toxins that result in localized infections and necrosis that eventually become liver abscesses.

Generally, the incidence of liver abscesses averages from 12 to 32% in most feedlots. However, there is a range of liver abscesses severity, from none, to one or two small abscesses, to two to four well-organized abscesses under one inch in diameter, to one or more large active abscesses or multiple small abscesses. Typically, only severe abscesses are associated with negative feedlot performance. Severe liver abscesses are associated with a 3.7% decrease in feed intake, an 11.5% decrease in average daily gain, a 9.7% increase in feed to gain ratio and a 1.9% decrease in carcass yield or dressing percent. The liver accounts for approximately two percent by weight, of the carcass which can add up to a significant financial loss. Additionally, when the liver has severe abscesses the liver can become fused to the visceral cavity requiring additional carcass trimming and further trim losses. However, it is not the loss of the liver or carcass trimming that is of the greatest economic concern. A summary of 266 control cattle in five studies conducted by Eli Lilly and Company (Elanco Animal Health) revealed that cattle with abscessed livers gained 4.9% less than cattle without abscesses. Brink et al. (1990) and Farlin (1980) both showed that minor liver abscesses did not measurably affect feedlot performance while severe liver abscesses negatively impacted feedlot performance. Barlte and Preston (1991) also demonstrated that cattle with severely abscessed livers had decreased average daily gain, and USDA quality and yield grades when compared with steers without liver abscesses. These results again indicate that only the most severe liver abscesses are detrimental to feedlot performance.

In a study by Brink et al. (1985), animals with severe liver abscesses began to show reduced feed intake as early as 15 days into the feeding period which persisted through the entire 112 day feeding period. Lechtenberg and Nagaraja (1991) observed that steers developed liver abscesses as early as three day postinoculation of *F. necrophorum*. Theses results indicate that once the rumen wall is damaged and bacteria can escape into the blood system a minimum of three days is needed before a liver abscess can initially form.

Abscesses that exist during the feeding period affect performance, whereas, abscesses that exist at slaughter affect yield and condemnation rates.

A macrolide antibiotic is typically fed by feedlots to reduce the incidence of liver abscesses. One such macrolide antibiotic is produced by a strain of the antnomycete *Streptomyces fradiae*. Tylosin is this macrolide antibiotic, which has the product name of Tylan®. Tylosin inhibits bacterial protein synthesis and is effective against *Antinomyces pyogenes* (gram positive bacteria) and *Fusobacterium necrophorum* (gram negative bacteria). Cattle treated with Tylan® typically gain faster, have a reduced feed to gain ration, and have reduced carcass trim with liver abscesses being reduced 63 to 71%. While Tylan® typically has a positive effect on reducing the incidence of liver abscesses; effects on performance are not consistent. Potter et al. (1985) found Tylan® improved average daily gain but had no effect of feed intake, whereas, Laudert and Vogel (1994) reported Tylan improved gain and feed to gain ratio while there were only minor effects on feed intake and dressing percentage.

Zilpaterol is an organic compound that has been found to exhibit beta-agonist activity. Zilpaterol can be used in its hydrochloride form, as describe in U.S. Pat. No. 4,525,770, which is incorporated by reference or the crystal form described in U.S. Pat. No. 5,731,028, which is incorporated by reference.

Beta agonists are fed at the end of the finishing phase for the last 20 to 40 days on feed, while ionophores and macrolide antibiotics are fed throughout the finishing period. The inventors have found that by removing the ionophore and macrolide antibiotic during the last 20 days to 40 days of feeding and replacing them with the single compound zilpaterol, one can achieve good weight gain and unexpectedly reduced liver abscesses. This is unexpected because the removal of the macrolide antibiotic during the last 20–40 days of the finishing period could potentially increase the incidence of liver abscesses.

One embodiment of the present invention is a method of feeding cattle with additives to increase beef production by feeding with an ionophore, such as monensin, in combination with a macrolide antibiotic, such as tylosin, up to the last 20 to 40 days of the finishing period, removing the ionophore and macrolide antibiotic from the feed and adding zilpaterol or zilpaterol hydrochloride to the feed for the last 20 to 40 days.

Another embodiment is a method of reducing feed intake of cattle and maintaining beef production, comprising administering to cattle feed an effective amount of an ionophore compound in combination with a macrolide antibiotic up to the last 20 to 40 days of a finishing period, then removing the ionophore compound and the macrolide antibiotic from the feed and adding zilpaterol to the feed as the single β-agonist compound present for the last 20 to 40 days of the finishing period.

Another embodiment is a method of reducing incidences of liver abscess in cattle fed with feed additives, comprising administering to cattle feed an effective amount of an ionophore in combination with a macrolide antibiotic up to the last 20 to 40 days of a finishing period, then removing the ionophore and the macrolide antibiotic from the feed and adding zilpaterol to the feed as the single β-agonist compound present for the last 20 to 40 days of the finishing period, wherein the reduction of liver abscess is compared to ionophore and macrolide antibiotic fed cattle throughout finishing period.

Studies

In study number V-0238-0017 a total of 3,945 steers were used to test the effects of Rumensin® plus Tylan® and zilpaterol on feedlot performance, liver abscess rates, and carcass traits. The inventors discovered that Tylan® and Rumensin® could be removed from the diet for the last 30 days to feed zilpaterol without negatively affecting liver abscess rates. In fact it was discovered that zilpaterol decreased the incidence of liver abscesses.

Study Number V-0238-0017, Effects of Zilpaterol on Liver Abscesses

| | Study Treatments | | | |
|---|---|---|---|---|
| | Rumensin + Tylan (No Zilpaterol) | No Rumensin, Tylan or zilpaterol | zilpaterol + Rumensin + Tylan | zilpaterol (No Rumensin or Tylan) |
| Live Abscess, % | 12.35 | 18.40 | 10.40 | 13.29 |

P-Value of Zilpaterol Main Effect on decreasing Liver Abscesses = 0.006

-continued

Study Treatments

| | Rumensin + Tylan (No Zilpaterol) | No Rumensin, Tylan or zilpaterol | zilpaterol + Rumensin + Tylan | zilpaterol (No Rumensin or Tylan) |
|---|---|---|---|---|
| P-Value of Rumensin and Tylan Main Effect on decreasing Liver Abscess <0.001 | | | | |

*The study consisted of a total of 3,945 steers; each of the four different treatments had 10 different pens of steers.
**Steers receiving Rumensin ® and Tylan ® received these feed additives for the entire 166-day study except for the last treatment (Rumensin ® and Tylan ® were removed during the last 30 days); steers receiving zilpaterol received zilpaterol for the last 30 days on feed.

In a separate set of three studies the inventors found that supplementing steers and heifers with zilpaterol for 20 or 40 days significantly decreased liver abscesses. All of these cattle had been fed Tylan® up to the last 20 to 40 days on feed at which time Tylan® was removed and cattle were either fed a control diet without Tylan®, Rumensin® or zilpaterol or cattle were fed a treatment diet containing just zilpaterol. While the mechanism by which zilpaterol decreases liver abscess is not fully clear at this time, it seems that zilpaterol functions to decrease liver abscesses by decreasing feed intake. Because the liver abscesses discovered at slaughter are formed during the last ~60 days or less on feed and this is the same time zilpaterol is fed, a decrease in feed intake would result in a decrease in acid production and possibly a decrease in rumen wall lesions and rumenitis.

Summary of Zilpaterol Efficacy Studies (Pooled Analysis), Study Numbers, V-0238-0019, V-0238-0020, and V-0238-0021 on Liver Abscesses and Feed Intake

| | Treatments | | |
|---|---|---|---|
| | Control | Zilpaterol | P-Value |
| % of Livers Condemned for Abscesses* | 25.0 | 19.1 | 0.0241** |
| Average Daily Dry Matter Intake, lbs. | 19.63 | 18.69 | 0.0129 |

*Percentages represent 957 animals. The three studies consisted of 32 pens of 10 animals.
**P-Value is based on the Cochran-Mantel Haenszel test, controlling for stratification parameters of duration, sex, and site in the pooled analysis.

I claim:

1. A method of increasing beef production in cattle with feed additives, comprising:
   feeding cattle with feed, comprising:
      an effective amount of an ionophore in combination with a macrolide antibiotic, and thereafter
   feeding cattle with feed, comprising:
      zilpaterol and essentially no ionophore or macrolide antibiotic for the succeeding about 20 to 40 days.

2. A method of reducing feed intake of cattle and maintaining beef production, comprising:
   administering to cattle feed an effective amount of an ionophore in combination with a macrolide antibiotic up to the last 20 to 40 days of a 90- to 225-day feeding period before harvest;
   administering for the last 20 to 40 days of the 90- to 225-day feeding period an effective amount of feed, comprising:
      zilpaterol as the single β-agonist compound present with essentially no ionophore or macrolide antibiotic.

3. A method of reducing incidences of liver abscess in cattle fed with feed additives, comprising:
   administering to cattle feed art effective amount of an ionophore in combination with a macrolide antibiotic up to the last 20 to 40 days of a 90- to 225-day feeding period before harvest;
   administering for the last 20 to 40 days of the 90- to 225-day feeding period an effective amount of feed, comprising:
      zilpaterol as the single β-agonist compound present with essentially no ionophore or macrolide antibiotic,
   wherein the reduction of liver abscess is compared to ionophore and macrolide antibiotic fed cattle throughout 90- to 225-day period.

4. The method according to claim 1, wherein the ionophore is monensin and the macrolide antibiotic is tylosin.

5. The method according to claim 2, wherein the ionophore is monensin and the macrolide antibiotic is tylosin.

6. The method according to claim 3, wherein the ionophore is monensin and the macrolide antibiotic is tylosin.

* * * * *